United States Patent

[11] 3,617,243

[72] Inventor Ulrich E. G. Neitzel
 Ogden, Utah
[21] Appl. No. 21,684
[22] Filed Mar. 23, 1970
[45] Patented Nov. 2, 1971
[73] Assignee Great Salt Lake Minerals & Chemicals Corporation
 Ogden, Utah

[54] PROCESS FOR THE PRODUCTION OF ANHYDROUS POTASSIUM MAGNESIUM SULFATE MATERIAL WITH LOW HYGROSCOPICITY FROM HYDRATED POTASSIUM MAGNESIUM SULFATE MATERIAL
12 Claims, 1 Drawing Fig.

[52] U.S. Cl..................................................... 71/63,
 71/64 DC, 23/121, 23/128, 263/53 A
[51] Int. Cl..................................................... C05d 1/00
[50] Field of Search........................................... 71/31, 63,
 64 D, 64 DC; 23/121, 128, 302, 304; 263/53 A;
 55/35, 388

[56] References Cited
UNITED STATES PATENTS
2,935,387 5/1960 Phillips.......................... 71/64 DC Primary Examiner—Reuben Friedman
Assistant Examiner—Charles N. Hart
Attorneys—David V. Trask, C. Harvey Gold and William S. Britt ABSTRACT: Hydrated potassium magnesium sulfate mineral material, notably schoenite and/or leonite, is heated sufficiently to drive off substantially all of its crystal water. The dehydrated mineral material is then held at a temperature above about 350° C. for a sufficient duration, usually at least 15 minutes, to substantially decreases the rate of moisture absorption from the atmosphere under storage conditions. Potassium magnesium sulfate which is heat treated in this fashion may be compacted or granulated without substantially increasing its hygroscopicity.

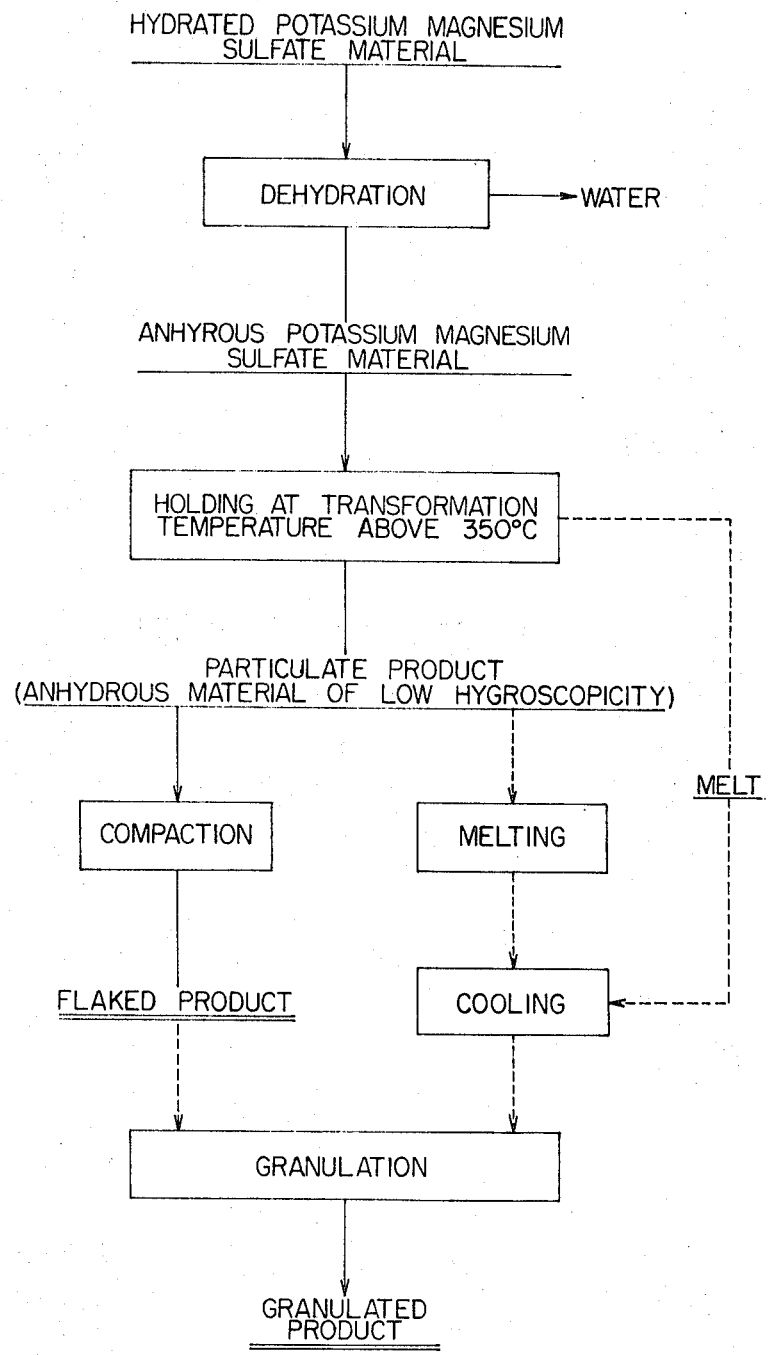

PROCESS FOR THE PRODUCTION OF ANHYDROUS POTASSIUM MAGNESIUM SULFATE MATERIAL WITH LOW HYGROSCOPICITY FROM HYDRATED POTASSIUM MAGNESIUM SULFATE MATERIAL

BACKGROUND OF THE INVENTION

1. Field

This invention relates to the production of soil supplements rich in potassium and magnesium but containing substantially no chlorine. It provides a process for producing anhydrous potassium magnesium sulfate with low hygroscopicity.

2. State of the Art

Different soils require different specific supplements to provide proper conditioning or nutrition for crops. Although potassium chloride is the potassium-rich compound most commonly applied to soils, chlorine is an undesirable additive for many soils. Chlorine-free potassium salts, such as potassium sulfate, have been applied to such soils in place of potassium chloride. Sulfate is not only more acceptable as an additive to many soils than is chlorine, but it is often a desirable soil supplement as well. Certain soils require magnesium supplement, and large quantities of magnesium oxide (MgO) are used for this purpose. Magnesium oxide is unsuitable for use on basic soils; moreover, it is not as soluble as desired for fertilizer use.

Langbeinite ($K_2SO_4 \cdot 2MgSO_4$) has been applied to the soil to provide potassium, magnesium, and sulfate in soluble, nonbasic form without chlorine. Langbeinite contains, on a weight basis, about 22 percent $K_2O$ and 19 percent MgO equivalent. Its $K_2O$ to MgO ratio is thus much lower than is desired for many fertilizer applications. A much higher $K_2O$ to MgO ratio is available in certain hydrated potassium magnesium sulfate minerals, notably schoenite ($K_2SO_4 \cdot MgSO_4 \cdot 6H_2O$) and leonite ($K_2SO_4 \cdot MgSO_4 \cdot 4H_2O$). Unfortunately, these compounds contain a substantial weight-percent of crystal water so that they are less suitable for shipping and marketing than is langbeinite. The crystal water may be driven from such materials by drying them at about 200° C. but the dried products readily absorb moisture under storage and handling conditions. A mixture of $K_2SO_4$ with natural kieserite ($MgSO_4 \cdot H_2O$) has low hygroscopicity, but natural kieserite is not sufficiently available for widespread use. Accordingly, it has heretofore not been economical to provide the desired high potassium to magnesium ratio in manufactured mineral supplements with both the potassium and the magnesium in sulfate form.

Although the $K_2SO_4$—$MgSO_4$—$H_2O$ system has been extensively studied, there has not, insofar as is known to applicant, been any process devised for producing an anhydrous potassium magnesium sulfate material having a $K_2O$ to MgO ratio substantially greater than about 1:1 and possessing a low hygroscopicity. Moreover, although fertilizer materials including potassium sulfate-containing materials have been subjected to various compaction and granulation techniques for product enhancement, there has not evolved from such techniques an anhydrous potassium magnesium sulfate material of the aforedescribed type with a sufficiently low rate of water uptake from the atmosphere to be suitable for prolonged storage and shipping in contact with the air. The schoenite and leonite materials of the prior art, for example, even though heated to dryness, convert to their hydrated forms within a short time after exposure to the atmosphere.

SUMMARY OF THE INVENTION

According to this invention, potassium magnesium sulfate material containing crystal water is heated to dryness. It is then held at elevated temperatures above about 350° C. for a duration sufficient to substantially decrease its rate of absorption of moisture from the air when it is stored for prolonged periods. Thus, it has been found that anhydrous potassium magnesium sulfate material obtained by conventional drying techniques can be modified by suitable heat treatment to substantially reduce its hygroscopicity. In this fashion, mineral materials; notably the hydrated potassium magnesium minerals schoenite and leonite; but including also other hydrated potassium magnesium sulfate crystal species and mixtures of $K_2SO_4$ and $MgSO_4$ wherein one or more of these materials is in hydrated form (e.g., Epsomite); may be treated to produce anhydrous materials practical for shipment, storage, and use in commerce as fertilizer materials.

A variety of heating programs may be relied upon to achieve the results of the present invention, the specific one selected in a given instance depending largely upon economic considerations. Of most importance is that the hydrated material be heated sufficiently to drive off substantially all of the crystal water and that the thus dehydrated material be held for a sufficient duration at a temperature above about 350° C. Beneficial results are obtained at any temperature between about 350° C. and about the melting point of the material, with the holding time required decreasing with increasing temperatures. Consistently good results are obtained at temperatures above about 400° C. with holding times of at least about 15 minutes, although substantial benefits may be realized with holding times of as low as about 5 minutes, particularly at higher temperatures. The preferred temperature range for holding dehydrated schoenite and/or leonite material is between about 500° and about 800° C. about 650° C. being the lower limit of the optimum temperature range. Holding times in excess of about 1 hour provide little if any additional benefit and are rarely justified economically.

There results from the aforementioned heat treatment a finely divided, particulate, anhydrous potassium magnesium sulfate material of very low hygroscopicity compared to anhydrous material produced by conventional drying techniques. Drying is conventionally done at below about 250° C. The material heat treated in accordance with this invention evidences a substantially decreased rate of absorption of moisture from the air.

By "substantially decreased rate of absorption," "decreased hygroscopicity," and similar expression, is meant a commercially significant decrease in the tendency of a material treated in accordance with this invention to absorb moisture from the air as compared to similar material which has merely been heated at lower temperatures to drive off all of its crystal water. Thus, for example, schoenite material dried at about 200° C. to remove substantially all of its crystal water, when stored in contact with air having 70 percent relative humidity at ambient temperature, converts back to schoenite within a relatively few hours. By contrast, schoenite treated in accordance with the optimum conditions disclosed herein may be stored for several days in contact with similar air without significantly increasing in weight due to moisture absorption. Within the context of this invention, any material with its hygroscopicity sufficiently low by reason of the heat treatment of this invention that it contains no more than about 10 percent by weight moisture after being stored in contact with 70 percent relative humidity air for 10 days meets the aforementioned criteria of having "substantially reduced tendency to absorb water" or a "substantially reduced hygroscopicity." In some instances, a lesser reduction would be commercially significant; i.e., would justify the cost of the treatment on economic grounds, but in most instances the practice of this invention results in even more substantial benefits.

The particulate, anhydrous material formed by the practice of this invention may be compacted or granulated in accordance with conventional techniques. Thus, the anhydrous, heat-treated material may be mixed with a sufficient quantity of water, rarely in excess of about 3 percent by weight, to provide cohesiveness to the material under compaction and the moistened material subjected to sufficient pressure to form flakes; e.g., in conventional pressure rollers. The flakes may be crushed to produce a granular material. It has been found that the optimum water content of the material for compaction is about 2 to about 2½ percent by weight. When less than about 2 percent water is included, the flakes produced under compression have inadequate strength, whereas when the moisture content exceeds about 2½ percent by weight, water is squeezed from the material under pressure. Although either of these effects may be tolerated to a limited degree is it normally preferred to control the water content between the optimum limits disclosed hereinbefore. The moistened material is ideally subjected to between about 10,000 and about 30,000 pounds per square inch pressure to produce strong, cohesive flakes, although greater or lesser pressures may be adequate or desirable in certain instances.

After the material is heat treated within the optimum range of between about 500° and about 700° C. it may be melted with a modest increase in temperature—typically about 750° C. to about 800° C. when the $K_2SO_2$ to $MgSO_4$ ratio is approximately 1:1. The molten material may be cooled and granulated in conventional fashion without losing any of the desirable hygroscopic properties obtained by virtue of the high temperature treatment.

DESCRIPTION OF THE DRAWING

The single FIG. of the drawing is a flow sheet illustrating what is presently regarded as the best mode for carrying out the invention.

DESCRIPTION OF THE ILLUSTRATED EMBODIMENTS

As illustrated, hydrated potassium magnesium sulfate material, usually schoenite and/or leonite material, is heated in a dehydration step to remove crystal water, and the resulting anhydrous material is held at a transformation temperature above 350° C. for sufficient duration to reduce its hygroscopicity. The aforementioned heating and holding steps may be combined if economically justified so that the hydrated potassium magnesium sulfate feed material is heated directly to a desired temperature above 350° C. and is held at that temperature until it is transformed into anhydrous potassium magnesium sulfate material of low hygroscopicity.

In some instances the holding temperature may be sufficiently high to melt all or part of the feed material, in which case the melt may be cooled and granulated as illustrated by broken lines. Preferably, the anhydrous material is held at a temperature below its melting point and the resulting particulate product is compacted to produce flaked product. The compacted flakes may be crushed to produce granules. The anhydrous, particulate product may be melted, cooled and granulated instead of being compacted. Although melting produces a product of greater bulk density, compacted material is often preferred because of its relatively greater rate of dissolution. Thus, according to many embodiments of this invention, melting of the the material being treated is avoided. One of the valuable contributions of the present invention is a method for producing an anhydrous material of low hygroscopicity without ever placing the material into the molten state.

Although the precise mechanism of the claimed invention is not entirely understood, and while applicants do not intend to be bound in any way hereby, it is believed that the enhanced properties of the materials realized by the practice of this invention are due to one or more structural changes (transformations) which occur in the mineral material when it is heated to temperatures in excess of about 350° C. A significant decrease in the characteristic hygroscopicity of the material is observed when it is held at about 350° C. for sufficient duration. This decrease corresponds to an exothermic reaction occurring at a slightly lower temperature (about 330°) believed to evidence a structural transformation. Significant decreases in hygroscopicity are noticeable at subsequent temperatures slightly above those corresponding to a series of endothermic reactions occurring, respectively, at about 570° C., about 620° C. and about 740° C. Although the transformations apparently themselves result in significant reductions in the hygroscopicity of the mineral material, there also appears to be a continuous and independent inverse correlation between the reduced hygroscopicity of a material and the temperature (above 350°C.) at which it is heat treated.

The invention will be more readily understood by reference to the following examples which, although illustrative of specific procedures included within the scope of the claims, is not intended to limit the invention in any way.

EXAMPLE I

A quantity of schoenite mineral material was dehydrated at 200° C. for about 3 hours. The material was weighed, and it was determined by difference that substantially all of the crystal water had been driven off. Some of the dried material was compacted by moistening it with about 3 percent by weight water and squeezing it between rollers about 20,000 pounds per square inch pressure. The resulting flakes were crushed and screened to isolate the −6+28 mesh fractions.

Several samples of both the uncompacted and compacted material were exposed to air containing about 70 percent relative humidity. The samples were weighed periodically to determine the amount of weight gained. It was found that the samples of finely divided material consistently picked up more moisture from the air during a given period of time than the samples of compacted material. This result is consistent with the general understanding of the art concerning the handling and treatment of hygroscopic inorganic mineral materials.

EXAMPLE II

Portions of −6+28 mesh uncompacted schoenite material dehydrated as in example I were heat treated at 600° C. for various periods of time as reported in table 1. Ten-gram samples from each portion were placed in a desiccator over a sulfuric acid solution mixed to maintain a relative humidity of 70 percent. The samples were weighed periodically, as reported in table 1, to determine the amount of weight gained. A sample of the material compacted as in example I was used as a control.

TABLE 1

| Sample description | Weight percent gain after: (hrs.) | | | | |
|---|---|---|---|---|---|
| | 24 | 48 | 120 | 168 | 216 |
| Control, compacted | 6.02 | 9.91 | 12.56 | 12.88 | 13.20 |
| 600°, ½ hr., uncompacted | 0.70 | 1.69 | 5.52 | 7.25 | 9.53 |
| 600°, 1 hr., uncompacted | 0.10 | 0.42 | 1.20 | 1.25 | 2.40 |
| 600°, 4 hr., uncompacted | 0.02 | 0.09 | 1.34 | 1.86 | 2.62 |

EXAMPLE III

A quantity of schoenite was dried in accordance with the procedure of example I. It was then heated to 800° C. and held at that temperature until it fused. The fused material was cooled to room temperature whereupon it formed hard, dense lumps. A portion of the lumps was crushed and screened. A 10 gram sample of the −6+28 mesh portion was placed in a desiccator under the same conditions as described in example II. After 408 hours, the sample was weighed and was found to have a weight gain of less than 1 percent. This material had a bulk density of about 1.3 as contrasted to about 0.9 for the compacted control of example I.

EXAMPLE IV

Following the procedure of example II, several portions of dehydrated uncompacted schoenite were heat treated at various temperatures for a period of about 2 hours. Results are reported in table 2.

TABLE 2

| Heat Treatment | Weight Percent Gained After: (hrs.) | | | |
|---|---|---|---|---|
| °C. | 48 | 120 | 92 | 336 |
| 600° | 0.05 | 0.07 | 0.23 | 0.79 |
| 550 | 0.05 | 0.06 | 0.47 | 1.60 |
| 500 | −0.01 | 0.01 | 0.52 | 3.54 |
| 450 | 0.14 | 0.18 | 1.26 | 6.21 |
| 400 | 0.23 | 0.55 | 3.14 | 9.67 |

| | | | | |
|---|---|---|---|---|
| Control-compacted | 4.88 | 9.92 | 11.27 | 11.87 |

*The sample treated at 600° C. gained only 4.5 percent by weight after 864 hrs. of storage.

EXAMPLE V

The procedure of example II was repeated. Several portions of the dehydrated, uncompacted material were heat treated at 650° C. for various durations. Results are reported in table 3.

TABLE 3

| Heat Treatment | Weight Percent | Gained After: (hrs.) | |
|---|---|---|---|
| Duration (hrs.) | 67 | 115 | 307 |
| ½ | 0.18 | 0.41 | 1.48 |
| 1 | 0.34 | 0.65 | 1.48 |
| 2 | 0.28 | 0.54 | 1.36 |
| Control-compacted | 8.38 | 11.38 | 12.84 |

EXAMPLE VI

The procedure of example V was repeated with a heat treatment temperature of 500° C. Results are reported in table 4.

TABLE 4

| Heat Treatment | Weight Percent | Gained After: (hrs.) | |
|---|---|---|---|
| Duration (hrs.) | 24 | 120 | 216 |
| ½ | 1.41 | 7.64 | 11.12 |
| 1 | 0.80 | 5.15 | 8.97 |
| 2 | 1.05 | 4.50 | 7.22 |
| Compacted control | 5.60 | 11.82 | 12.90 |

EXAMPLE VII

The procedure of example IV was repeated with a sample taken from a separate quantity of dehydrated material. Results are reported in table 5.

TABLE 5

| Heat treatment, ° C. | Weight percent gained after: (hrs.) | | | | |
|---|---|---|---|---|---|
| | 24 | 96 | 192 | 312 | 504 |
| 500 | 0.16 | 1.83 | 4.33 | 5.02 | 7.00 |
| 600 | 0.16 | 1.00 | 2.18 | 2.51 | 3.40 |
| 700 | 0.22 | 0.76 | 1.00 | 1.03 | 1.13 |
| Control, compacted | 5.27 | 11.45 | 12.63 | 12.81 | 13.19 |

During the same test, several samples heat treated at 600° C. for various times and in accordance with the procedure of examples V and VI were stored in the dame desiccator for comparison. Results are reported in table 6.

TABLE 6

| Heat treatment duration (hrs.) | Weight percent gained after: (hrs.) | | | | |
|---|---|---|---|---|---|
| | 24 | 96 | 192 | 312 | 504 |
| 2 | 0.16 | 1.00 | 2.18 | 2.51 | 3.40 |
| 1 | 0.08 | 0.83 | 2.11 | 2.40 | 3.35 |
| ½ | 0.12 | 1.16 | 2.96 | 3.56 | 5.32 |
| Control, compacted | 5.27 | 11.45 | 12.63 | 12.81 | 13.19 |

I claim:

1. A method for the production of substantially anhydrous potassium magnesium sulfate of low hygroscopicity from hydrated potassium magnesium sulfate mineral material comprising:
heating said hydrated material to sufficiently high temperature and for sufficient duration to substantially dehydrate it; and
subjecting said dehydrated material to a temperature above about 350° C. for a duration in excess of about 5 minutes sufficient to substantially decrease its rate of absorption of moisture from the air when it is stored for prolonged periods.

2. A method according to claim 1, wherein the dehydrated potassium magnesium sulfate mineral material is subjected to a temperature up to about its melting point.

3. A method according to claim 2, wherein said dehydrated material is held at a temperature above about 400° C. for at least about 15 minutes.

4. A method according to claim 3, wherein the hydrated material is selected from the group consisting of schoenite and leonite.

5. A method according to claim 4, wherein the dehydrated schoenite and/or leonite material is subjected to a temperature between about 500° and 700° C.

6. A method according to claim 2, wherein after the dehydrated material is held at said temperature for said sufficient duration it is melted, cooled to solidify, and the solidified material crushed to produce a granular product.

7. A method according to claim 1, wherein the dehydrated material is mixed with sufficient water up to about 3 percent by weight to provide cohesiveness to the material under compaction; the moistened material is subjected to sufficient pressure to form flakes; and the flakes are crushed to produce a granular material.

8. A method according to claim 7, wherein the dehydrated material is mixed with about 2 to about 2½ percent by weight water.

9. A method comprising:
heating mineral material selected from the group consisting of schoenite and leonite to remove substantially all of its crystal water thereby to produce substantially dehydrated potassium magnesium sulfate material;
subjecting said dehydrated material to a temperature below its melting point but above about 500° C. for at least about 15 minutes; and
cooling said material to ambient temperature.

10. A method according to claim 9, wherein the dehydrated material is melted prior to being cooled to ambient temperature.

11. A method according to claim 9, wherein the dehydrated material is subjected to a temperature between about 500° and about 800° C. for a period of at least about 1 hour.

12. A method according to claim 9, wherein the dehydrated material is subjected to a temperature above about 650° C. for a period of at least about one-half hour.

* * * * *